United States Patent [19]

Every et al.

[11] 4,115,139

[45] Sep. 19, 1978

[54] PRODUCTION OF RAW MIX CEMENT SLURRIES HAVING REDUCED WATER CONTENT

[75] Inventors: Richard L. Every, Barrington; Jose T. Jacob, Lake Zurich, both of Ill.

[73] Assignee: Chemed Corporation, Cincinnati, Ohio

[21] Appl. No.: 869,993

[22] Filed: Jan. 16, 1978

[51] Int. Cl.$^2$ ............................................... C04B 7/38
[52] U.S. Cl. .................................................. 106/100
[58] Field of Search ...................... 106/100, 314, 315; 260/124 R

[56] References Cited

U.S. PATENT DOCUMENTS

| | | | |
|---|---|---|---|
| 2,900,266 | 8/1959 | Shaver | 106/100 |
| 2,905,565 | 9/1959 | Dietz et al. | 106/100 |
| 3,726,850 | 4/1973 | Detroit | 260/124 R |
| 3,956,261 | 5/1976 | Lin | 260/124 A |
| 4,053,323 | 10/1977 | Adams et al. | 106/100 |

*Primary Examiner*—James Poer
*Attorney, Agent, or Firm*—Charles L. Harness

[57] ABSTRACT

Lignin carboxylic acid is added to raw cement mix slurry prior to wet-grinding, whereby the amount of water required is reduced.

5 Claims, No Drawings

PRODUCTION OF RAW MIX CEMENT SLURRIES HAVING REDUCED WATER CONTENT

This invention relates to an improved process for reducing water content of raw mix slurries used in the manufacture of cement by the wet process.

In the manufacture of cement by the wet process, a slurry of the raw mix is pumped into the kiln where water is evaporated and the raw mix calcined to obtain Portland cement clinker. To save fuel in the calcining step it is desirable to reduce the water content of the raw mix slurry without increasing or altering the viscosity of the slurry. Numerous processes using chemical compositions as water reductants in raw mix slurries have been proposed. Lignin sulfonic acid is known for this use. See U.S. Pat. No. 2,390,225. However, the instant additive, lignin carboxylic acid, is believed novel for this process. It is superior to lignin sulfonic acid.

The instant invention involves addition of 100–10,000 ppm, and preferably 500–2000 ppm of lignin carboxylic acid to the raw cement mix slurry. If desired, the additive can be added to the dry materials before water is added; or it can be added to the slurry after it is made up, and either before or after it is ground; or it can be added during the grinding operation. The range of 100–10,000 ppm is based on the total slurry weight, i.e., solids plus added water. The additive works preferably on slurries containing about 10–90% water.

The raw cement mix slurry can be prepared from any conventional mix which on burning (calcining) forms cement clinker. Typical raw materials include lime, silica (generally as sandstone) alumina (generally as an alumino-silicate) iron oxides, and sometimes others. Lime may be provided as limestone, cement rock, chalk, marl, and blast furnace slag. Silica and alumina may be found in clay, shale, slate, cement rock, and blast furnace slag.

When the slurry containing the lignin carboxylic acid is charged to the kiln, the water evaporates and the raw materials are burned to clinker. At the kiln temperature, the lignin derivative is destroyed and has no further effect on the clinker or the final cement product.

Lignin is a very complex natural polymer. To a large extent is consists of the unit

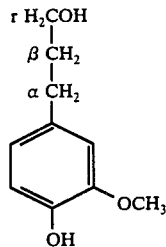

Typically, this unit is joined to adjacent units via the $\alpha$ and $\beta$ carbond, and in that case, there is only one hydrogen on each of these two carbons. But numerous modifications abound across the macromolecule. Binding may be from either $\alpha$ or $\beta$ (with corresponding subtraction of H atoms), or by $\alpha$ or $\beta$ plus a ring bond. There may be a hydroxyl atom on $\alpha$. The $\alpha$ - $\beta$ carbon bond may be unsaturated. The molecule may be joined to other intricate ring systems. The complexity of structure is indicated variously in the literature. See *Lignin Structure and Reactions, Amer. Chem Soc., Advances in Chemistry Series,* J. Marton, Symposium Chariman p. 59 (1966). In view of the difficulty in defining the structure of lignin it has become customary in nomenclature for modified lignins simply to state "lignin" plus the structural formula of the modification. Such lexicography has been used in describing the instant additives (*Lignins,* K. V. Sarkanen and C. H. Ludwig, editor, published by Wiley-Intersaince; Chapter 13, Modification Reactions, by G. G. Allan, pp. 524–525.) In that reference, thiolignin is reacted with an $\alpha$-halogeno carboxylic acid. Phenol groups on the lignin react, forming (in our case) Lignin-$(O)_n$—$(CH_2)_x COOR$, where $n$ is 0–1, $x$ is 1–4 and R is H, Na, K, $CH_3$, or $C_2H_5$. In the reference procedure R is H and $x$ is 1, but obviously the carboxylic acid group may be neutralized with alkali to give the corresponding Na or K salt, or may be esterified by conventional procedures to give the corresponding methyl or ethyl ester. The molecular weight of such lignin carboxylic acid (or salt or ester) is typically 1000–80,000, and preferably 6000–8000. Preferably the free carboxylic acid is used —i.e., R is H.

EXAMPLE 1

A "limestone" type raw mix cement slurry (herein, Cement Slurry No. 1) was used in this example. It was 54.82% solids, balance water. The solids were made up of the following materials:

| Composition of Cement Slurry No. 1 | |
|---|---|
| Limestone | 62.5% |
| Cement rock | 18.6% |
| Marl | 0.5% |
| Clay and shale | 9.7% |
| Blast furnace slag | 0.8% |
| Gypsum | 2.7% |
| Sand and sand stone | 1.4% |
| Iron materials | 0.5% |
| Miscellaneous | 3.3% |
| | 100.0% |

The viscosity of this slurry at 25°C. was 10,000 centipoises (cp). After addition of 1000 ppm of lignin carboxylic acid, viscosity was 100 cp. This indicated that additional solids could be added to the slurry without increasing the viscosity beyond that obtained without lignin carboxylic acid. Accordingly ground solids of the above analysis were added to cement Slurry No. 1 until the viscosity reached 10,000 cp. We found that the total level of solids reached was 60.48%. Thus the addition of this small amount of lignin carboxylic acid permitted an additional $$\frac{(60.48 - 54.82) \times 100}{54.82} = 10.3\% \text{ solids.}$$

In a comparable run, lignin sulfonic acid, 1000 ppm, gave a viscosity of 6,250 and a solids concentration of only 55.80% to reach control viscosity, amounting to an incremental solids addition of $$\frac{(55.80 - 54.82)}{54.82} \times 100 = 1.8\%.$$

EXAMPLE 2

A "shale" type cement slurry (herein, Cement Slurry No. 2) was used in this example. It was 53.05% solids, balance water. The solids were made up of the following materials.

| Composition of Cement Slurry No. 2 | |
|---|---|
| Shale | 50.0% |
| Cement rock | 31.1% |
| Marl | 0.5% |
| Lime stone | 9.7% |
| Blast furnace slag | 0.8% |
| Gypsum | 2.7% |
| Sand and sand stone | 1.4% |
| Iron materials | 0.5% |
| Miscellaneous | 3.3% |
| | 100.0% |

The viscosity of this slurry at 25° C. was 5,580 centipoises. After addition of 1000 ppm lignin carboxylic acid, viscosity was 1000 cps.

As in the case of Example 1, this indicated that additional solids could be added to the slurry without increasing the viscosity beyond that obtained without lignin carboxylic acid. Accordingly ground solids of the above analysis were added to Cement Slurry No. 2 until the viscosity reached 5,580 cps at 25° C. We found that the total level of solids reached was 62.32%. Thus the addition of this small amount of lignin carboxylic acid permitted an additional $$\frac{(62.32 - 53.05) \times 100}{53.05} = 17.5\%.$$

In a comparable run, lignin sulfonic acid at 1000 ppm gave a viscosity of 4,200 and a solids addition to only 54.10%, amounting to an incremental increase of $$\frac{(54.10 - 53.05) \times 100}{53.05} = 2\%.$$

What is claimed is:

1. A process for the production of a raw mix cement slurry which comprises adding thereto an effective amount of lignin carboxylic acid of average molecular weight 1000–80,000 and having the formula

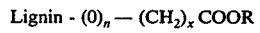

in which $n = 0-1$, $x$ is 1–4 and R is selected from the group consisting of H, methyl, ethyl, Na, and K; thereby to reduce the water content of the slurry and to conserve the amount of fuel required to evaporate water from the slurry during burning; said effective amount being within the range of about 100–10,000 ppm based on the total weight of the slurry.

2. A process according to claim 1 in which $x$ is 1, R is H, and the average molecular weight is 6000–8000.

3. A process according to claim 1 in which the effective amount is 500–2000 ppm.

4. A process according to claim 3 in which the effective amount is 1,000 ppm.

5. A process according to claim 2, in which $n = 0$.

* * * * *